US012479549B2

(12) United States Patent
Bognet et al.

(10) Patent No.: US 12,479,549 B2
(45) Date of Patent: Nov. 25, 2025

(54) STRUCTURE FOR A FLETTNER-TYPE ROTARY RIGGING

(71) Applicant: FARWIND ENERGY, Nantes (FR)

(72) Inventors: Brice Bognet, Suce sur Erdre (FR); Antoine Caillaud, Nantes (FR)

(73) Assignee: FARWIND ENERGY, Nantes (FR)

(*) Notice: Subject to any disclaimer, the term of this patent is extended or adjusted under 35 U.S.C. 154(b) by 0 days.

(21) Appl. No.: 18/914,092

(22) Filed: Oct. 12, 2024

(65) Prior Publication Data

US 2025/0121921 A1 Apr. 17, 2025

(51) Int. Cl.
*B63H 9/02* (2006.01)
*B63H 9/061* (2020.01)

(52) U.S. Cl.
CPC ............... *B63H 9/02* (2013.01); *B63H 9/061* (2020.02); *B63B 2231/34* (2013.01); *F05B 2240/931* (2013.01)

(58) Field of Classification Search
CPC .................................. B63H 9/02; B63H 9/061
See application file for complete search history.

(56) References Cited

U.S. PATENT DOCUMENTS

| | | | | |
|---|---|---|---|---|
| 4,630,997 | A * | 12/1986 | Cousteau | B64C 21/06 416/4 |
| 8,746,162 | B2 * | 6/2014 | Holohan | B63H 9/02 114/102.29 |
| 10,099,762 | B2 * | 10/2018 | Väinämö | B63H 9/02 |
| 11,142,294 | B2 * | 10/2021 | Malpede | B63H 9/04 |
| 2009/0241820 | A1 | 10/2009 | Wobben | |
| 2014/0370288 | A1 | 12/2014 | Sherwood et al. | |

FOREIGN PATENT DOCUMENTS

| | | | |
|---|---|---|---|
| CN | 111003130 | A | 4/2020 |
| FR | 2985212 | A1 | 7/2013 |
| NO | 339258 | B1 | 11/2016 |

* cited by examiner

*Primary Examiner* — Justin D Seabe
(74) *Attorney, Agent, or Firm* — Jean C Hamann

(57) ABSTRACT

The invention pertains to a Flettner-type type rotary rigging (100) comprising a tower (131, 132) comprised inside a cylindrical outer skin (121) centered on a vertical axis (110) of rotation and comprising a connection with the cylindrical outer skin (121) and comprising a tower structure consisting of an assembly of structural members comprising wood fibers.

4 Claims, 9 Drawing Sheets

STRUCTURE FOR A FLETTNER-TYPE ROTARY RIGGING

CROSS-REFERENCE TO RELATED APPLICATIONS

This application claims priority of French Application 23 11069 filed on Oct. 13, 2023.

BACKGROUND OF THE INVENTION

The invention belongs to the field of velic propulsion, more particularly to Flettner-type rotary riggings.

The invention is more particularly, but not exclusively, intended for relatively large Flettner-type riggings with diameters greater than 3 meters and heights greater than 15 meters to even more than 50 meters.

A Flettner-type rotary rigging uses the Magnus effect acting on a cylindrical mobile driven in rotation around a spinning axis in a fluid flow, i.e. the wind, to produce a thrust perpendicular to both the direction of the wind and to the spinning axis.

The thrust thus generated is a function of the wind exposed surface of the cylindrical mobile, i.e. the product of the diameter by the length of the cylinder, of a ratio between the tangential velocity on the surface of the cylinder and that of the wind and a slenderness ratio between the height and the diameter of the cylinder.

Favorable aerodynamic performance is obtained for a slenderness ratio comprised between 5 and 10 and for speed ratios greater than 1, between the tangential speed on the surface of the rotating cylinder and the wind speed.

When such a rigging is used to propel a vessel, for instance a bulk carrier, as a main or as an auxiliary propulsion means, the propulsion power demand to move the ship is in the megawatt ballpark. Such a performance may be reached with Flettner-type rigging with a large cylinder size, with a diameter ranging from 3 to 10 meters and a height ranging from 15 to 80 meters, spinning at speeds of 10 to 300 rpm.

Under some stresses generated by the wind and the spin, this type of rigging may be subject to vibrations and such vibrations may be harmful for the life of the rig, causing premature wear of various components, and even damages to the rigging or the hull of the vessel.

These vibrations may be amplified by some resonance of the rig during its operation, more particularly if the spin frequency is close to some eigenfrequencies of the rig.

Though, for large Flettner-type riggings, such eigenfrequencies may be close to the rotation frequencies enabling to take advantage of the Magnus effect.

US 2009/0241820A1 (NO 339258) describes a Flettner-type rigging comprising an outer skin guided in rotation around an internal tower but remains silent about the structure of this tower and the materials making it.

U.S. Pat. No. 10,099,762 B2 describes a Flettner-type rigging comprising an inner tower around which an outer skin making an aerodynamic surface is guided in rotation. The outer skin is built by assembling a plurality curved panels made of a laminated material. The material making these panels, obtained by resin infusion, is a thermosetting polymer matrix composite reinforced by glass, aramid or carbon fibers. This document remains silent on the structure of the inner tower.

SUMMARY OF THE INVENTION

The shortcomings of the prior art may be overcome by a Flettner-type rigging comprising:

- an outer skin of cylindrical shape centered on a vertical axis of rotation, comprising an outer aerodynamic surface comprised in a cylindrical envelope with a diameter D and a height L, in which D is greater than or equal to 3 meters and an L/D ratio is greater than 5;
- a tower comprised inside the cylindrical outer skin and comprising a connection with the cylindrical outer skin;
- in which a tower structure is made by an assembly of structural members comprising wooden fibers.

Wood is a building material with a high modulus of elasticity to density ratios, while remaining affordable, and easy to implement especially for large parts.

Thus, by selecting such a building material for a tower structure the eigenfrequencies of the Flettner-type rigging may be moved towards higher frequencies, thus enabling higher spinning speeds of the Flettner rigging and spreading the operation of the rigging over more wind conditions, while limiting the effect of vibrations on wear and comfort.

In addition, the construction principle by assembling wooden beams or panels, and multiplying interfaces between the structural members, may provide some damping under cyclic stresses, also limiting resonance phenomena and reducing the amplitude of vibrations without affecting the rigidity of the rigging.

The Flettner-type rigging may be implemented according to the embodiments and variants exposed hereafter, which are to be considered individually or according to any technically operative combination.

Structural members may consist of a material selected from a plain wood, a glulaminated wood, a cross-laminated timber, a laminated veneer lumber, an acetylated wood and a wood fiber-reinforced composite or any combination thereof.

The material the structural members are made of is selected so that a ratio $S=\sqrt{E/\rho}$ where E is a longitudinal modulus of elasticity and $\rho$ a density of the material greater than $3.10^3\ m\cdot s^{-1}$.

The tower structure may be a closed surface tubular structure consisting of structural members assembled together along assembly interfaces.

The closed surface tubular structure may be made up of flat panels made of cross-laminated timber.

The closed surface tubular structure may comprise aeration openings.

The tower structure may also be an openwork framework.

The openwork framework tower structure may comprise laminated veneer lumber panels covering openings of the openwork frame tower structure.

The Flettner-type rigging may include a balancing device.

According to some embodiment the balancing device may comprise a plurality of masses and a worm screw driven by a step motor configured to move radially and individually each mass of the plurality.

According to some other embodiment, the balancing device may comprise a plurality of balancing weights each individually movable by a step motor on a toothed ring set on an inner circumference of the Flettner-type rigging.

BRIEF DESCRIPTION OF DRAWINGS

The Flettner-type rigging structure may be implemented according to the nonlimiting embodiments set out below in reference to FIG. 1 to FIG. 9 in which.

DETAILED DESCRIPTION OF THE INVENTION

Figure 1:
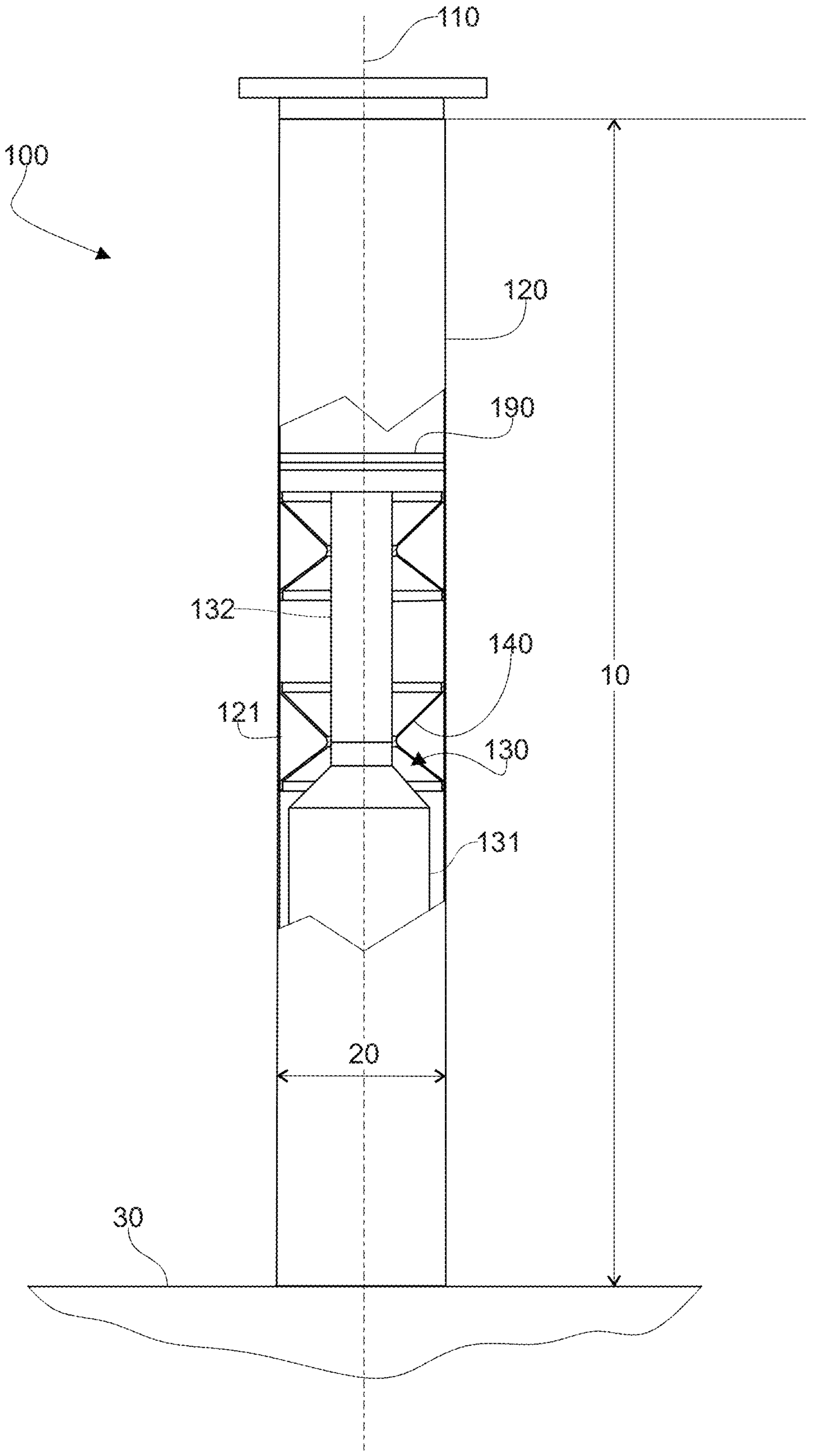
FIG. 1 represents, in a front view and in partial section, some example of a Flettner-type rotary rigging.

FIG. 1 according to some exemplary embodiment, a Flettner-type type rigging (100) adapted to the propulsion of a ship, extends to a height (10) L, greater than 50 meters in relations to a deck (30) of the ship, according to an outer aerodynamic surface (120) of cylindrical shape made by an outer skin (121) centered on a vertical axis (110) of rotation and included in an envelope diameter (20) D, greater than 3 meters, commonly greater than 5 meters and less than or equal to 10 meters, so that a slenderness L/D ratio is comprised between 5 and 8.

The term cylindrical is not limited to a straight cylinder having a constant diameter over its height.

In operation, when providing a propulsion force suitable for moving a ship, the rigging spins around the vertical axis (110) at a rotation speed, such that a tangential speed on the outer aerodynamic surface (120) is greater than an apparent wind speed, preferentially greater than 2 times the speed of a wind to which the rigging is subjected, which leads to a rotation speed of more than 10 rpm usually comprised between 100 rpm and 300 rpm, commonly comprised between 100 and 200 rpm and often comprised between 100 and 150 rpm.

In such operating conditions, the Flettner-type rigging (100) generates a velic thrust perpendicular to the wind direction and to the vertical axis (110) of rotation of the outer aerodynamic surface (120).

Given the dimensions of the rig, an order of magnitude of the intensity of the velic thrust acting on the rigging is in the hundreds of kN ballpark.

According to some embodiment, the outer aerodynamic surface (120) is an external surface of an outer skin (121) made, for example, by an assembly of light panels made of wood, a composite material or even by stretched canvases.

The rotational guidance, the stability, the rigidity and the transmission of the velic thrust of the rigging to the vessel are provided by a tower (130), comprising a lower section (131), and an upper section (132) of decreasing diameters from the deck of the vessel (30) to the top of the Flettner-type rigging (100) and to which an outer skin comprising the outer aerodynamic surface is attached.

Depending on the design variant, the tower is fixed, and the outer skin is connected to it by rotational guiding means such as rolling bearings, or, the tower is a rotor and the outer skin is connected to the tower by means forming a complete connection, either directly on the outer surface of the tower, or through radial spacers.

In general, and without being bound by any theory, the technical solution comprising a fixed tower and an aerodynamic skin driven in rotation and guided in rotation around the fixed tower, is more favorable when the following criteria are met, alone or in combination:

- when the Flettner-type rigging is large, with a diameter greater than 3 meters and/or a height greater than 10 meters, or when the Flettner-type rigging has a large slenderness L/D greater than 5, or
- when a spinning speed of the Flettner-type rigging may be greater than 80 rpm.

Apart from these cases, the technical solution of a skin attached to the tower and the tower being driven in rotation may sometimes be economically more advantageous.

Figure 8:
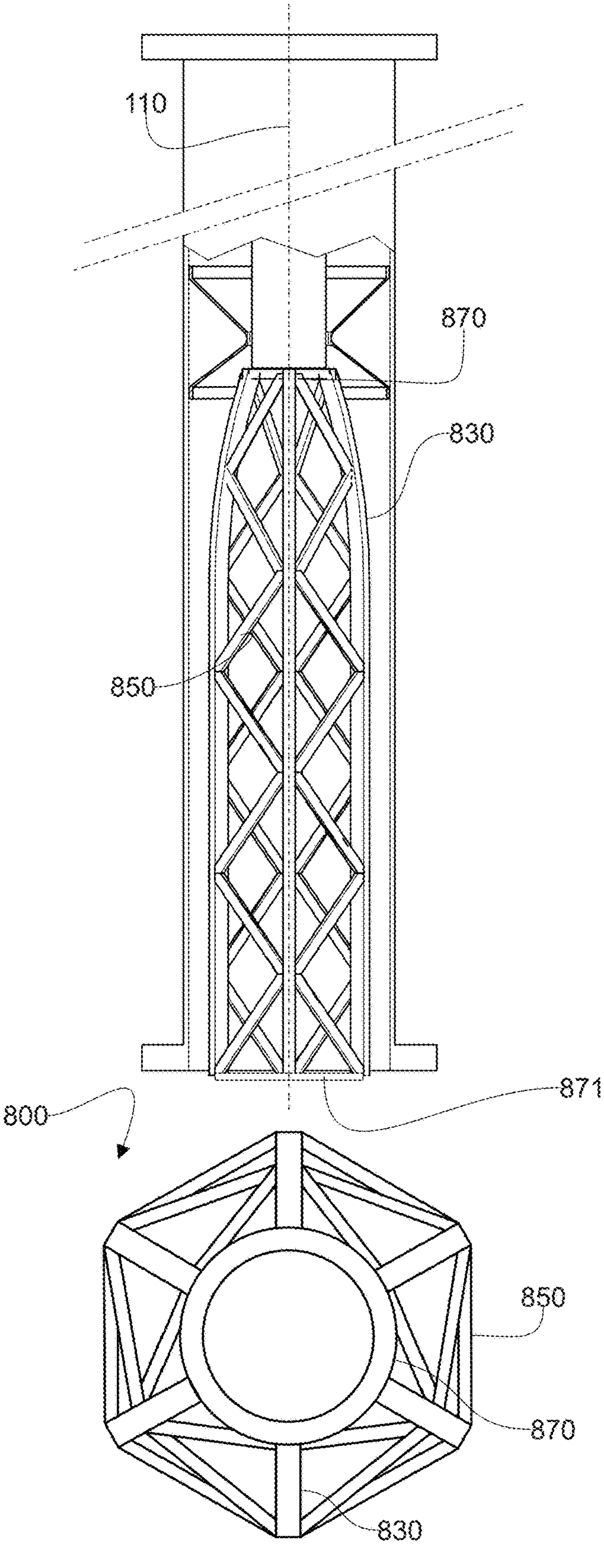
FIG. 8 represents according to a front view and a partial section an exemplary embodiment of a Flettner-type rotary rigging comprising an exemplary embodiment of a tower structure comprising an assembly of truss beams as well as a top view of the tower structure, the top view and the front view are not at the same scale.
Figure 9:
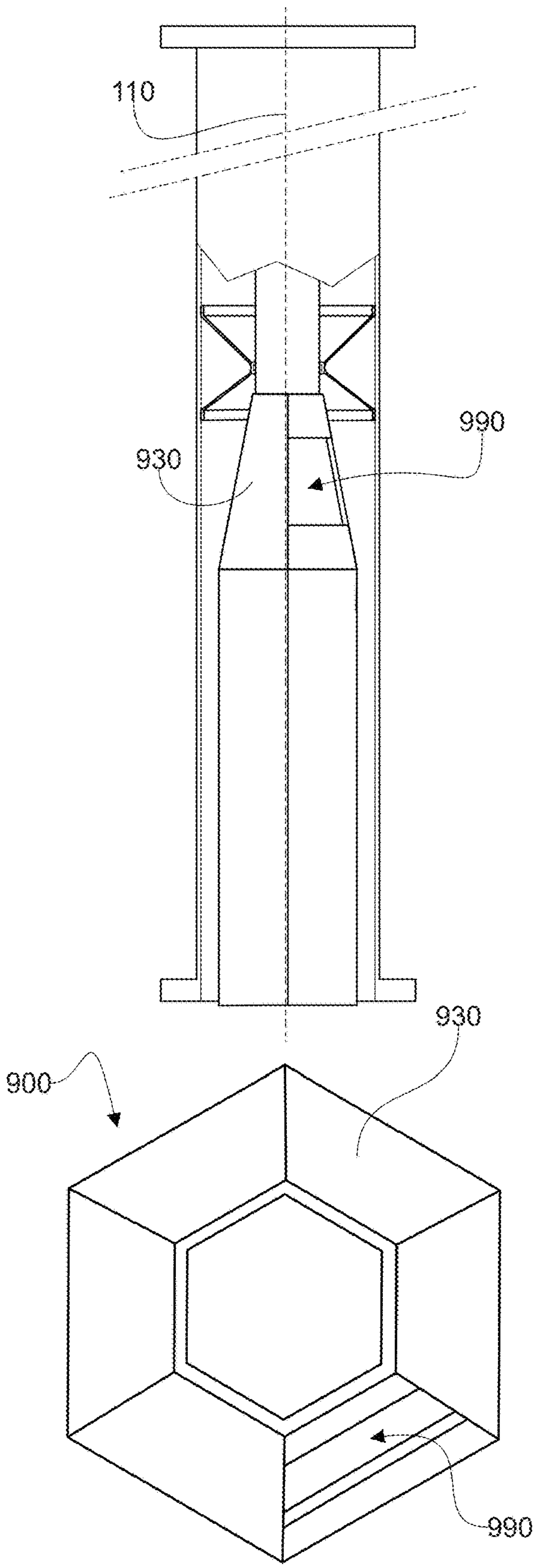
FIG. 9 represents according to a front view and a partial section an exemplary embodiment of a Flettner-type rotary rigging comprising an exemplary embodiment of a tower structure made of cross laminated timer panels as well as a top view of the tower structure, the top view and the front view are not at the same scale.

Therefore, in FIG. 1, FIG. 8 and FIG. 9 showing a simplified sketch of the Flettner-type rigging, the intermediate devices (140) may represent either fixed radial spacers or rolling bearings.

The whole rig reaches a mass of tens of metric tons (1 ton=$10^3$ kg).

Thus, in operation, such a rigging, weighing tens of tons and with a high slenderness, spins at a speed of about a hundred rpm and is subjected to a radial force, corresponding to the velic thrust, the intensity of which includes a variable component with amplitudes of tens of kN.

These conditions lead to vibrations that may accelerate the wearing or even damage the rigging.

In order to limit these vibrations, the objective is to shift the eigenfrequencies of the rigging, specifically in bending, to frequencies outside the range of main eigenfrequencies generated in the intended rotating speed range of the rigging.

For instance, a spinning speed range of 100 rpm to 150 rpm may generate main loading frequencies comprised between 1.67 Hz and 2.5 Hz To this end, whatever the design variant, the tower (130) is designed in such a way as to offer a high stiffness for a mass low as possible, so as its first eigenfrequency is high enough.

This objective is achieved by the selection of the material of which a tower structure is made and by its construction principle.

Pertaining to the material selection, such a result may be obtained for a material with a high S ratio, with S:

$$S = \sqrt{\frac{E}{\rho}} \qquad \text{Math 1}$$

Where E is the longitudinal modulus of elasticity, or Young's modulus, of the material and ρ the density of the material, S being expressed in $m \cdot s^{-1}$.

A material is said to exhibit a high S ratio when $S>3.10^3$ $m \cdot s^{-1}$. Such values are reached in particular by steels, special alloys, structural composites reinforced with continuous glass or carbon fibers, wood, and ceramics. However, among all these materials, wood, with a S ratio of more than $3.10^3$ $m \cdot s^{-1}$, also exhibiting a low density and being well suited for an affordable manufacturing cost of large members.

Thus, the selection of wood or its technical derivatives allows the construction of a rigid, lightweight and cost saving tower structure.

In addition, the selection of this material reduces the carbon footprint of the manufacturing.

The following table gives some examples of the properties of wood species compared to those of a SAE 304 (ISO 3506) austenitic stainless steel. For wood, these properties are given for stresses in the direction of fibers.

TABLE 1

| Type | Density [kg/m3] | Young's Modulus [Pa] | S [m/s] | Yield stress [MPa] |
|---|---|---|---|---|
| Pine wood | 500 | 1.40E 10 | 5.29E 03 | 35 |
| Oak | 700 | 9.00E 09 | 3.59E 03 | 70 |
| Bamboo | 400 | 2.00E 10 | 7.07E 03 | 200 |
| Austenitic stainless steel | 7850 | 2.00E 11 | 5.05E 03 | 500 |

These same species may be used in the form of glulam, cross-laminated timber, laminated veneer lumber, or in the form of a composite comprising more than 50% in mass of wood fibers, bamboo fibers, for instance, can be spun into reinforcing fibers or fabrics as described in document FR2985212A1.

The wood selected for making the tower structure may be treated by acetylation in order to increase its hardness and durability, particularly in a marine environment.

According to various embodiments presented below, the tower structure may comprise a plurality of structural members in the form of beams or panels made mainly of wood fibers comprised in a wood or in a technical derivative of wood.

These structural members are assembled to form the structure of the tower.

Figure 3:
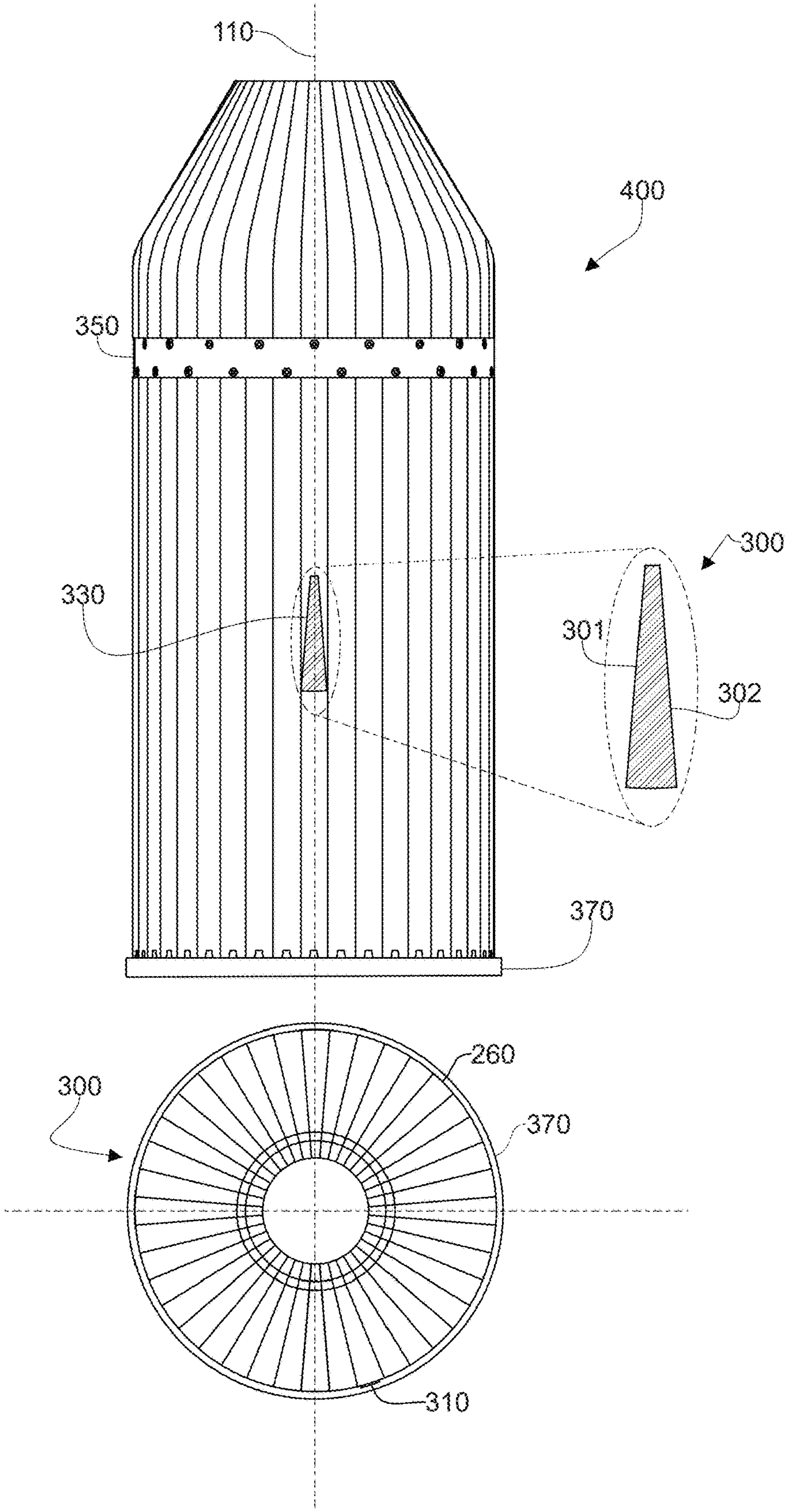
FIG. 3 shows according to a front view and a top view, an example a tower structure made of jointed beams.
Figure 4:
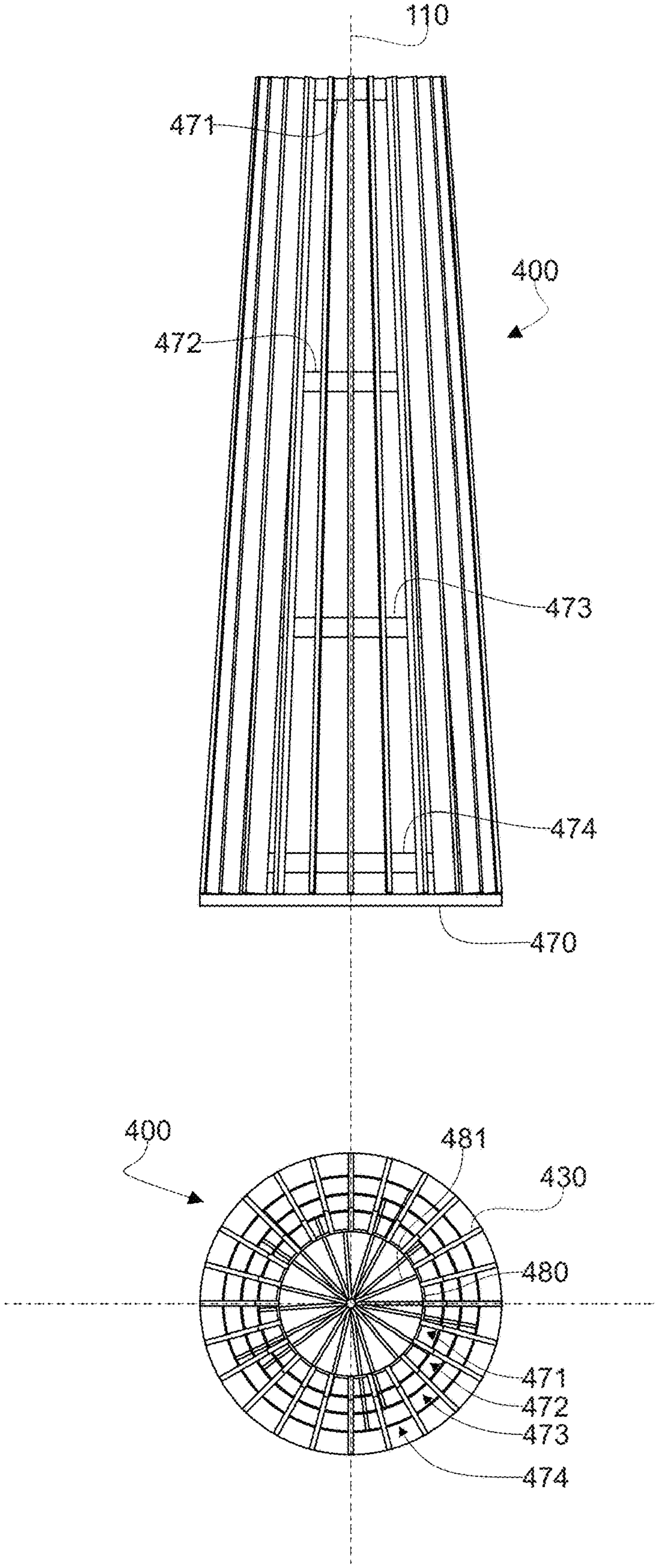
FIG. 4 shows according to a front view and a top view, an example a tower structure made of joint beams.
Figure 5:
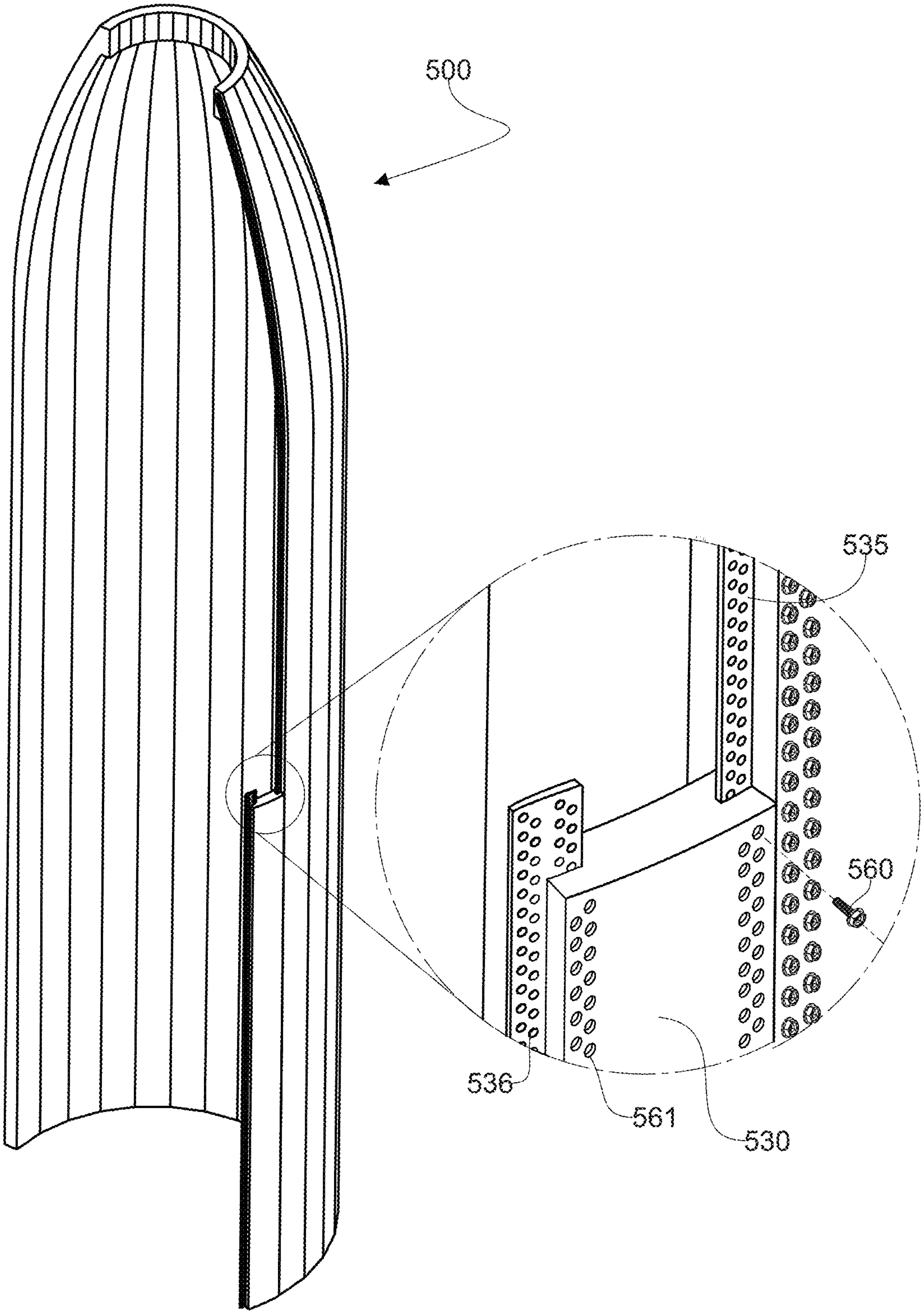
FIG. 5 represents, according to a partial perspective view, another exemplary embodiment of a tower structure with joint beams.

Exemplary embodiments of the tower structure may comprise a set of joined assembled structural members, as shown in FIG. 3, FIG. 5 and FIG. 9 so as to form a closed surface tubular structure, or assemblies of structural members in an openwork framework and on which, an inner shell or an outer shell, different from the aerodynamic surface, may or may not be assembled. These examples are shown in FIG. 4 and FIG. 8

Openwork framework structures facilitate ventilation of the interior of the Flettner-type rigging, whose internal temperature is likely to rise, especially if used in hot climates.

An openwork framework structure is generally lighter, which promotes higher eigenfrequencies.

Closed surface tubular structures or structures with a paneled surface are better protected from water infiltration into the tower.

Such closed surface tubular structures tend to be heavier than openwork framework structures, but they are better damped due to the many interfaces in contact.

The tower structure is always tubular, leaving sufficient internal passage for passing technical members such as power, control or measurement electrical cables, hydraulic or pneumatic pipework, slings, for installing technical means such as motors, winches, pumps, batteries or forced ventilation means, at different heights, and more particularly for allowing personnel to access the interior of the tower structure and to reach all technical means as well as the internal surface of the Flettner-type rigging.

To ease this accessibility the interior of the tower may comprise means such as ladders (not represented) and the tower structure, whether of the closed surface tubular type or of the openwork framework type may comprise an access hatch (not represented) between the exterior and the interior of the tower structure.

In the following examples the tower structure made of wood pertains to the lower tower section (131). This section bears the higher loads in operation. It shall be understood that the same construction principles may apply to the upper tower section (132) or, the upper tower section (132) may be built differently, for instance, as a metallic or composite tube connected to the lower tower section (131) structure.

Figure 2:
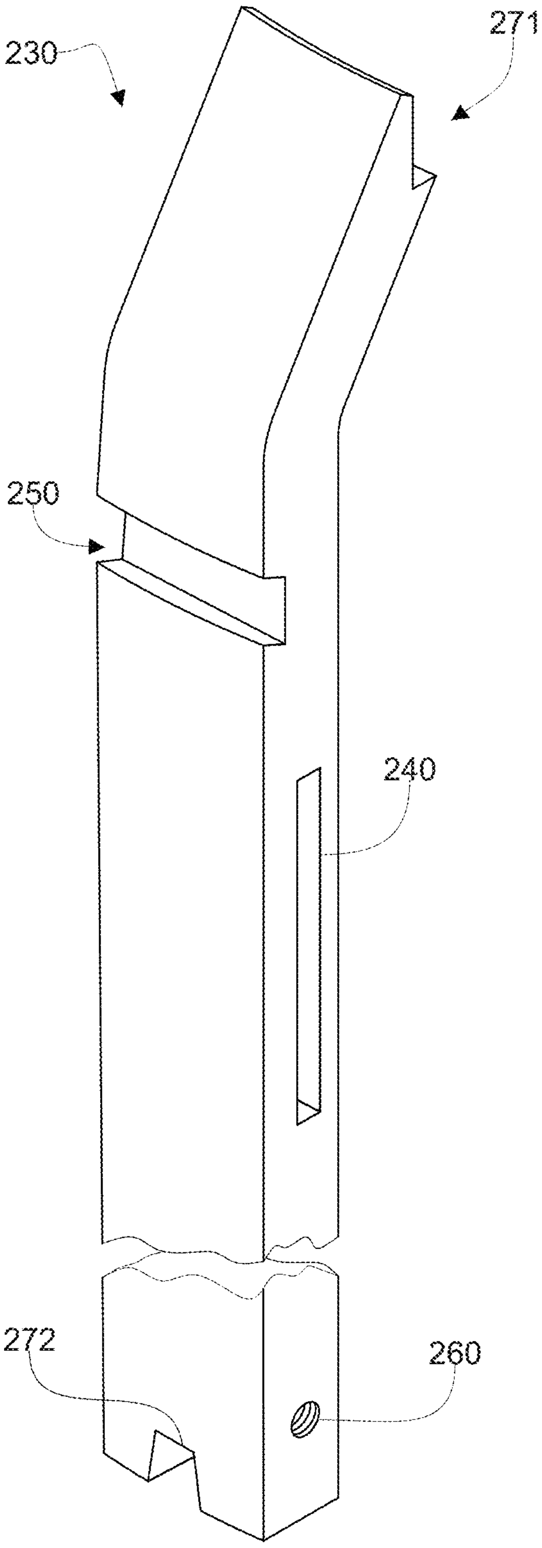
FIG. 2 shows according to a perspective view an example of a beam intended for the manufacture of one tower per assembly.

FIG. 2 according to some exemplary embodiment, the tower structure is made up of a plurality of beams (230).

Each beam (230) may comprise means for its assembly with two other beams of the plurality, at least one among means for a wedgelock or a tenon and mortise assembly (240), means for a hoop assembly (250), the binding hoop may consist of a metallic material or a fiber-reinforced composite material, means for a pulling assembly (260), the ties may comprise rigid rods or cables.

Such means may be combined over the height of the beam and the tower structure. The assembly may be supplemented by metal fittings and spacers (not shown) nailed to the beams.

According to some embodiment, the beams may comprise machined portions (271, 272) at their ends. The beam may comprise an upper machined portion (271), at an upper end for positioning and holding a second section of the tower, and a lower machined portion (272), at a lower end for coupling the tower with a rotational drive, in an embodiment where the tower is used as a rotor, or for connecting the tower to the hull of a ship in an embodiment where the tower is fixed.

FIG. 3 the beams may be jointly assembled along interfaces so as to make an exemplary embodiment of a first tower structure (300).

The beams may be assembled on a pedestal (370). The pedestal (370) may be made of steel or concrete. When the tower is fixed, it may, for example, be bolted to the pedestal. In some embodiment where the tower is a rotor, a spigots flange coupling may be provided between the lower end of the tower and the pedestal, the pedestal being driven in rotation.

In addition, the beams may be assembled by their upper part with a binding hoop (350).

The binding hoop may also make a bearing surface for a rolling bearing and a rotational guidance of an outer skin on the tower.

The wedge-shaped cross section (330) of the beams, joined by their lateral faces (301, 302), constituting assembly interfaces, in cooperation with the binding hoop (350), make the assembly stable by design, in particular with respect to the pressure exerted by the velic thrust.

The forces acting on the tower structure are transmitted through the interfaces locked by the lateral friction of the beams between each other and are distributed throughout the structure of the tower. Thus, the assembly interfaces provide significant damping to the tower structure.

Once assembled, the first tower structure (300) may be subjected to cylindrical turning, for instance on a vertical lathe, of its outer or inner cylindrical surfaces to perfect the concentricity of the tower structure with respect to the vertical axis (110) of rotation.

Beams (230) may be made of a wood selected in one of the types listed in Table 1 or of a technical derivative such as a glulam or a LVL.

Additionally, the inner or outer surfaces of the tower structure and beams may be covered, before or after assembly, with a composite fibrous layer (310) of glass, carbon, aramid, or natural linen, hemp or bamboo fibers, or thin panels of wood fibers such as LVL so as to reinforce the structure in a direction orthogonal to a direction of the natural fibers of the wood pieces.

FIG. 4 according to some embodiment of a first tower structure in openwork framework (400), the beams may be upright posts (430) assembled so that their lateral faces are not joined. Such an exemplary embodiment results in a lightweight tower structure.

The upright posts (430) may be assembled to wheels (471, 472, 473, 474) at different heights along the vertical axis (110). Each wheel may comprise a rim (480) and spokes (481). The rim may be made of a metallic material, such as steel, a light aluminum or titanium alloy, or of a composite material with a thermosetting or thermoplastic organic matrix reinforced with continuous fibers of glass, carbon, or biobased organic fibers such as flax, hemp or bamboo.

The wheels may be all of the same diameter, the openwork framework extending according to a straight cylinder, or the wheels may be of diameters scalable along the vertical axis (110), the openwork framework being of a conical shape.

The spokes (481) may be made of the same material as the rim, or alternatively, may be made of wood or a technical derivative of wood.

The assembly is attached to a ferrule (470) in its bottom part, the ferrule comprising means for connection with a pedestal.

Stays (not shown) may be tensioned between the wheels in directions intersecting the vertical axis (110). Such an arrangement stiffens the whole, particularly with regard to bending stresses.

The openwork framework thus made can be covered, on its outer face or inner face, with wooden fiber panels such as LVL panels, with a panel thickness ranging from 30 mm to 400 mm depending on the height along the vertical axis (110), in order to close some openwork parts and act as a bracing between the upright posts in order to stabilize the structure with regard to shearing forces.

FIG. 5 according to some other exemplary embodiment, a second closed surface tower structure (500) may be made of grooved beams (530) on two faces making assembly interfaces, assembled via metal tongues (535) inserted into the grooves of adjacent grooved beams (530).

The assembly may be secured by a plurality of bolts (560) passing through bores (561) in the grooved beams (530) and in the metal tongues (535).

The metal tongues (535) may be pre-punched by circular perforations (536) or by oblong or polygonal perforations, of cylindrical or conical shape, smooth or pre-tapped perforations so as to cooperate with the bolts (560).

Alternatively, perforations may be made by counter-boring when drilling the bores (561) in the grooved beams, or through predrilled bores, or by self-drilling screws.

Seaming the grooved beams (530) together by bolts (560) may be carried out on the inner, the outer or on both sides of the tower structure by means of bolts (560) crossing through or not.

FIG. 8 according to yet another embodiment, a second openwork frame tower structure (800) this may be a truss structure comprising at least one ferrule (870), for example in its upper section, to which vertically extending chord beams (830) are connected. The chord beams (830) may be made of wood or a technical wood derivative such as glulam or LVL without these examples being limiting.

Truss beams (850), also made of wood or a technical derivative of wood, extend in a lattice structure between the chord beams (830).

The openwork framework thus made may comprise a lower ferrule (871) for its connection with a pedestal fixed or rotating.

The ferrules may be made of a metallic material, such as steel, a light aluminum or titanium alloy, or of a composite material with a thermosetting or thermoplastic organic matrix reinforced with continuous fibers of glass, carbon, or biobased organic fibers such as flax, hemp or bamboo.

Assemblies between the chord beams (830) and the truss beams (850) may be made by nailed or screwed steel fittings.

FIG. 9 according to another exemplary embodiment, a third closed surface tower structure (900) consists of cross-laminated wood panels, also referred to as CLT panels for "Cross Laminated Timber".

Such panels are composed of several crossed layers of dried solid wood planks selected from fir, maritime pine spruce, Scots pine and Douglas-fir without these examples being limiting. Their mechanical characteristics are sufficient to use them, without additional frame, as a floor, a wall or a bracing.

The panels (930) are flat and have a thickness comprised between 50 mm and 600 mm, the thickness being larger for those used at the bottom of the tower structure then decreasing according to the vertical axis (110).

The panels are directly assembled so as to form a hollow polygonal section, here hexagonal according to the nonlimiting example of FIG. 9.

The panels may be assembled by bolt seaming with metal tongues inserted in grooves routed in the panels as in FIG. 5.

Such flat panels are rigid and easy to manufacture, cut, be routed and assembled.

The tower structure may comprise openings (990) to improve its interior ventilation.

Whatever the embodiment, structural members made of wood or technical derivatives of wood may be protected from the environment by fungicide treatments and marine protection varnishes.

Going back to FIG. 1 the Flettner-type rigging (100) may comprise one or more balancing devices (190) distributed over the height of the rigging. These balancing devices enable to reduce the vibrations of the rotating rigging.

These balancing devices make it possible to carry out periodic and frequent balancing of the structure, mainly made of wood, due to the evolution of the initial balancing following a modification of the hygrometry of the structure or of the thermal expansion of the beams and panels.

Figure 6:
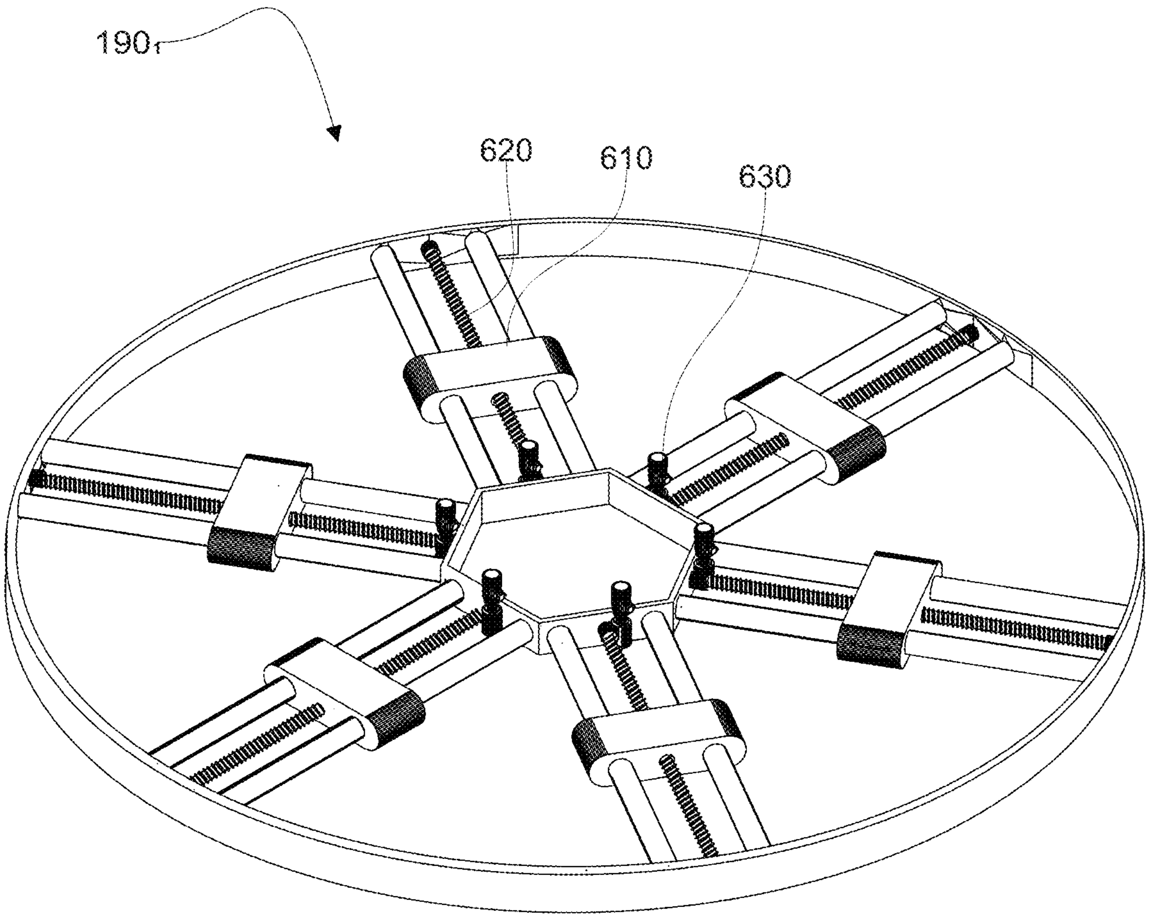
FIG. 6 shows in a perspective view an example of a balancing device for a Flettner-type rigging.

FIG. 6 according to some embodiment, the balancing device (1901) may comprise a plurality of masses (610) and means like a worm screw (620) driven by a step motor (630) for individually moving radially each mass of the plurality.

Figure 7:
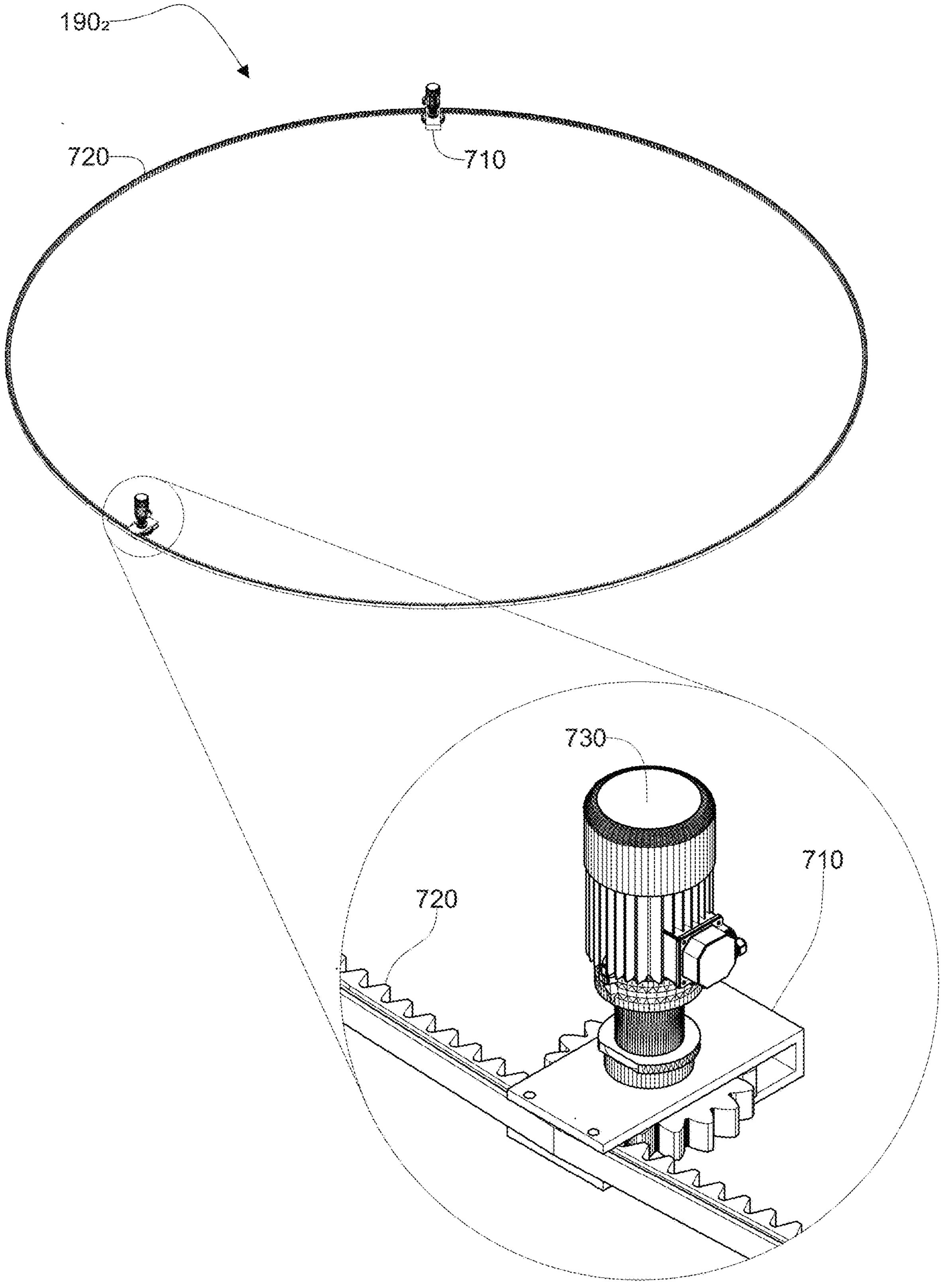
FIG. 7 shows in a perspective view another exemplary embodiment of a balancing device for a Flettner-type rigging.

FIG. 7 according to some other embodiment, the balancing device (1902) may comprise a plurality of balancing weights (710) each individually movable by a step motor (730) on a toothed ring (720) set on an inner circumference of the Flettner-type rigging.

These two embodiments may be combined at different heights of the same rigging.

The above description and the exemplary of embodiments show that the invention achieves the intended purpose and allows the economical realization of a lightweight and rigid rotary rigging by using mainly biobased materials.

The invention claimed is:

1. A Flettner-type rotary rigging comprising:

an outer skin of cylindrical shape centered on a vertical axis of rotation, comprising an outer aerodynamic surface comprised in a cylindrical envelope with a diameter D and a height L, in which D is greater than or equal to 3 meters and a L/D ratio is greater than 5;

a tower comprised inside the outer skin and comprising a connection with the outer skin;

wherein a tower structure is made of an assembly of structural members comprising wood fibers; and wherein the structural members form an openwork framework with laminated wood panels covering openings of the openwork framework.

2. The Flettner-type rotary rigging of claim 1, wherein the structural members are made of a material selected among a wood, a glulam, a cross-laminated timber, a laminated veneer timber, an acetylated timber and a wooden fiber-reinforced composite.

3. The Flettner-type rotary rigging of claim 2, wherein a ratio $$S = \sqrt{\frac{E}{\rho}}$$

where E is a longitudinal modulus of elasticity and p a density of a material constituting the structural members is greater than $3.10^3\ m^{s-1}$.

4. The Flettner-type rotary rigging of claim 1, comprising a balancing device.

* * * * *